United States Patent [19]
Sokolow

[11] 3,932,120
[45] Jan. 13, 1976

[54] DEVICE FOR POSITIVE POSITIONING OF TUBULAR WORKPIECES

[75] Inventor: Nickolas N. Sokolow, Roscoe, Ill.

[73] Assignee: Beloit Corporation, Beloit, Wis.

[22] Filed: May 17, 1974

[21] Appl. No.: 471,147

[52] U.S. Cl. .................. 432/121; 65/323; 432/122
[51] Int. Cl.² .......................................... F27B 9/00
[58] Field of Search ....... 432/121, 122, 124; 65/323

[56] References Cited
UNITED STATES PATENTS

| | | | |
|---|---|---|---|
| 1,607,607 | 11/1926 | Cramer | 65/323 |
| 2,820,621 | 1/1958 | Hess | 432/122 |
| 3,372,655 | 3/1968 | Williams | 432/122 |
| 3,556,494 | 1/1971 | Cines | 432/122 |
| 3,627,282 | 12/1971 | Kinslow, Jr. | 432/122 |
| 3,787,170 | 1/1974 | Gilbert | 432/122 |

FOREIGN PATENTS OR APPLICATIONS

| | | | |
|---|---|---|---|
| 575,563 | 4/1924 | France | 65/323 |

*Primary Examiner*—John J. Camby
*Attorney, Agent, or Firm*—D. J. Veneman; B. L. Samlan; G. A. Mathews

[57] ABSTRACT

A device for positively positioning a tubular workpiece on a carrier, and in particular for positioning a tubular parison on a carrier of a conveyor within a parison heating oven. The parisons are engaged by a cam operated positioning cap which exerts a downward force on the top of the parison to position the parison on its carrier member.

19 Claims, 6 Drawing Figures

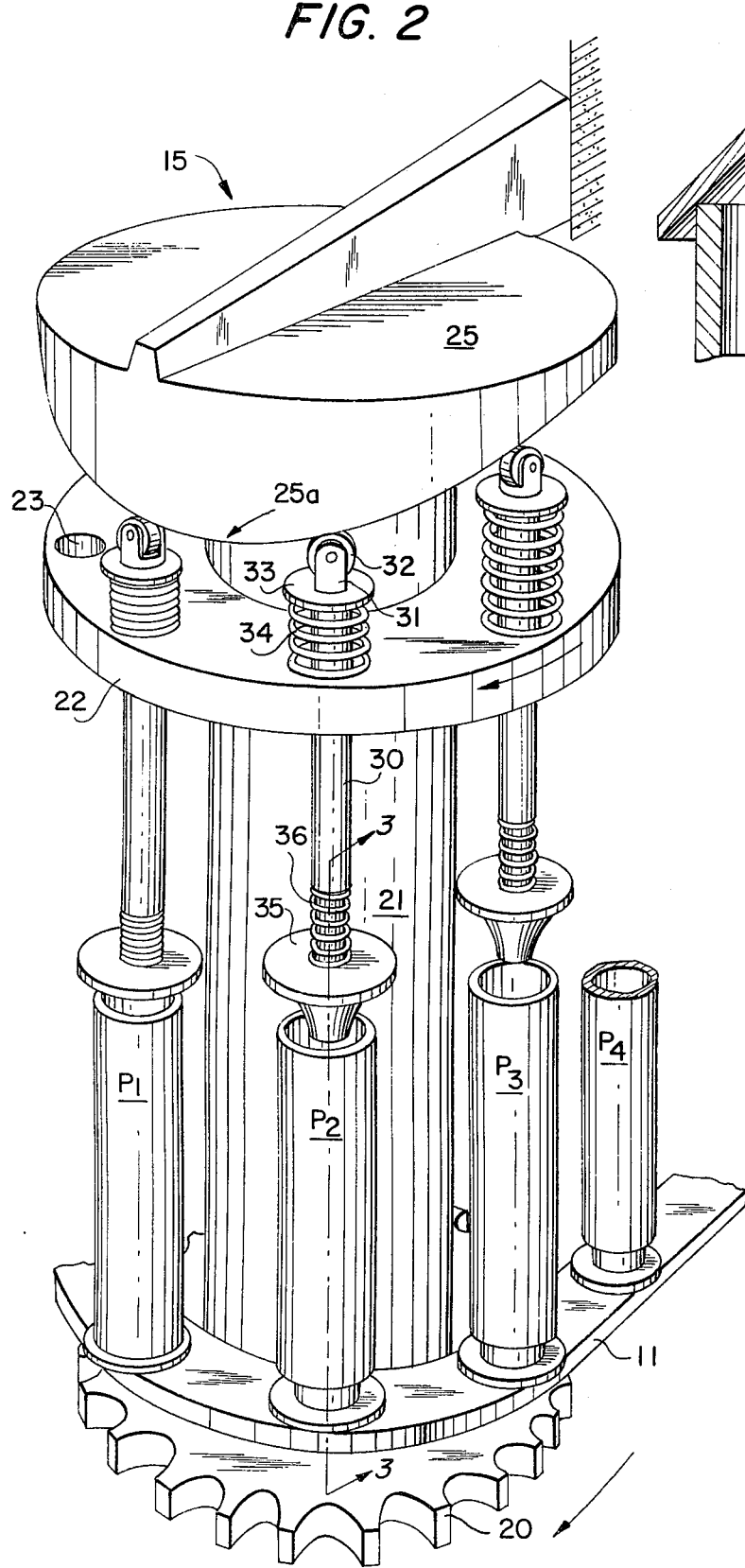
FIG. 2
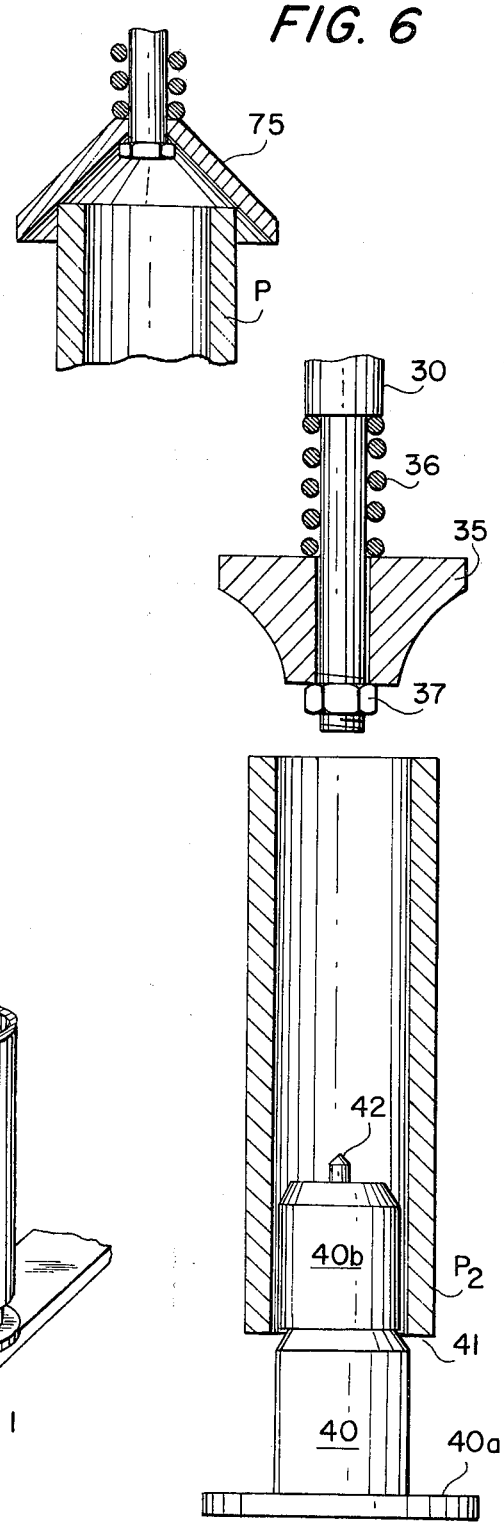
FIG. 6
FIG. 3

DEVICE FOR POSITIVE POSITIONING OF TUBULAR WORKPIECES

BACKGROUND OF THE INVENTION

This invention relates to positioning of tubular workpieces, and in particular it relates to the correct positioning of a tubular parison on a carrier member associated with a parison heating oven.

In the art of blow molding, the starting material delivered to the blow mold is usually a hollow cylindrical tube knwon as a parison. Since the parisons must be hot when they are formed into finished articles, the original technique was to take the parison as soon as it was formed by the extrusion apparatus, and while still hot transfer it directly to the blow molding apparatus. However, since it has been found undesirable to necessarily link together the process of forming the parisons and the process of forming the finished articles, a further technique has been developed, known as the cold parison technique, wherein the parisons, upon being formed, are first of all cooled down and usually stored for a period of time after which they are reheated and blow molded. The separation of these two functions provides the significant advantage that the process of forming the parisons may be separated in time and geographically from the process of forming the finished articles. The separation of these two functions of course means that the process of forming the finished articles must start with cold parisons which must first be heated. Consequently, this latter technique has become known as the cold parison technique.

A method and apparatus for carrying out the cold parison technique is shown and described in commonly owned U.S. Pat. No. 3,765,813, issued Oct. 16, 1973. This patent illustrates an oven into which the parisons are placed and in which the parisons are heated to a forming temperature, after which the heated parisons are removed and carried to a blow mold, whereat the parisons are stretched longitudinally and then blow molded into finished articles.

As shown in the said patent, the parisons are loaded by gravity onto upwardly extending carrier members which then carry the parisons through the oven. It is of critical importance that the parisons be heated uniformly as they travel through the oven. Except for the case where non-uniformed heating is applied and carefully controlled for obtaining certain conditions, it is necessary that the parison be heated uniformly so that the subsequent stretching and blow molding steps will act upon the parison in a uniform manner. Otherwise, for example if the parison is not heated uniformly along its length or around its circumference, the finished article will have an improper weight distribution and hence will have to rejected. Obviously rejects constitute waste which is expensive and should be minimized if not totally eliminated.

Many methods and structural features are provided in the parison heating oven to achieve this required uniformity. For example the airflow through the oven is carefully controlled and the parisons are rotated about their axes.

However, these procedures designed to enhance heating uniformity presume in the first instance that the parison is at a specified position relative to its carrier member, i.e. that it is properly positioned on its carrier member. However, it has been found that with the present technique of loading the parisons onto their carrier members by dropping them vertically thereonto, many of the parisons have not in fact moved downwardly onto the intended, proper position on their respective holders. Moreover, with the presently known apparatus there is no further means for positively positioning a parison which did not achieve the proper position at the loading station. Consequently, many of the parisons remain in an improper position as they travel through the oven. For example, a parison might not fall downwardly far enough, whereupon it would sit high on its carrier member and perhaps tilt to one side. Such improperly positioned parisons would then continue through the oven and be heated in an unintentional, undesirable non-uniform manner, whereupon that parison would be stretched and blow molded in a non-uniform manner, resulting in a reject. Such improper positioning might be caused for example if the parison is slightly out of round, as a result of which the inside would be slightly oval, resulting in at least one short inside diameter preventing the complete downward movement of the parison onto its carrier member.

Previous attempt to assure proper positioning of parisons onto their respective carrier members have centered on tightening tolerances of the parison and the carrier member. However, the cost of very close tolerances are unreasonably high and they still cannot prevent an unreasonably high number of rejected parisons.

Thus, there is a need for an improvement which will economically and reliably assure that the parisons are properly positioned on their carrier members.

SUMMARY OF THE INVENTION

Thus, it is a purpose of the present invention to provide a new and improved arrangement for assuring proper positioning of parisons on their carrier members.

This purpose of the present invention is achieved by providing a device located along the oven conveyor, preferably just downstream from the loading station, which engages a just loaded parison from above and exerts a downward force onto the parison so that a parison which was not properly positioned on its carrier member will be moved downwardly into the proper position.

In accordance with a preferred embodiment, the present invention comprises a positioning cap mounted to move vertically down onto the parison while concurrently moving in a horizontal path with the conveyor for at least a portion of the travel of the conveyor. This positioning cap may be mounted on a rod adapted to move vertically, and this vertical movement can be controlled by a cam means engaged by follower means associated with the said rods.

In accordance with one preferred embodiment, the rods can have followers at their upper ends which engage a fixed cam, and in another embodiment the rods can be connected to horizontal arms which in turn engage the cam, said arms being further connected to means which permit the arms to slide vertically while spring biassing the said arms against the cam.

In a parison heating oven, this positive placement means may be located at a turn in the conveyor, i.e. wherer the conveyor engages a sprocket wheel or the like for a 90° or 180° turn. The various rods and positioning caps can then be connected to a mounting means turnable with the sprocket while a circular cam may be fixedly connected with respect to the oven housing so as to cooperate with the various means rotating with the sprocket.

Thus, it is an object of the present invention to provide a new and improved device for centering and positioning a workpiece on its holder.

It is still another object of this invention to provide an apparatus for properly positioning a parison on its carrier in a parison heating oven.

It is still another object of this invention to provide for a parison heating oven an arrangement including a plurality of positioning caps which, under the action of suitable cam and follower means, are operable to move downwardly to exert a downward force on parisons which have just been gravity loaded onto their respective carrier members to assure proper positioning of these parisons on their carrier members.

Other objects and the advantages of the present invention will become apparent from the detailed description to follow, together with the accompanying drawings.

BRIEF DESCRIPTION OF THE DRAWINGS

Preferred embodiments of the invention will now be described in detail with reference to the accompanying drawings which are provided solely for purposes of illustration and in which:

FIG. 2 is a perspective view of a first embodiment of a parison positioning apparatus constructed in accordance with the features of the present invention, this view being taken generally in the direction of the arrow A in FIG. 1.

FIG. 3 is an enlarged cross-sectional view of a portion of FIG. 2 taken in the plane indicated by the line 3—3 of FIG. 2.

FIG. 6 is a partial view illustrating a modification of the present invention.

DETAILED DESCRIPTION OF THE PREFERRED EMBODIMENTS

Figure 1:
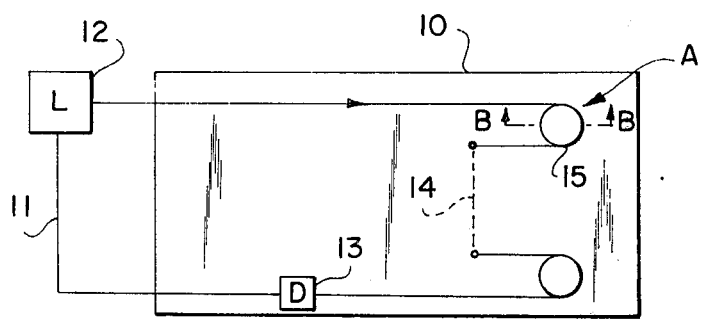
FIG. 1 is a schematic view of a parison heating oven which incorporates the features of the present invention.

Referring now to the drawings, like elements are represented by like numerals throughout the several views.

FIG. 1 illustrates diagramatically a parison heating oven 10 having a conveyor means 11 preferably in the form of an endless chain conveyor having carrier members attached thereto for carrying the parisons through the oven 10 in an upright position to be heated therein to a forming temperature. The parisons are loaded onto the carrier members at a loading station 12. The carrier members are then carried through the oven along a path of sufficient length to assure that the parisons remain in the oven for a sufficient period of time. In practice, the endless conveyor may pass back and forth through the oven numerous times as shown for example in the said earlier patent. For purposes of the present invention, however, this extensive path through the oven is indicated simply by the dotted line portion 14. When the parisons have been heated to the proper forming temperature, they reach the discharge station 13 where suitable means are provided for grasping the upper end of the heated parison and removing it upwardly out of the oven and for then carrying the heated parison to a blow molding station.

If a heated parison is to ultimately result in an acceptable finished article, it is important that the parison be heated uniformly along its length and about its circumference. (This disregards certain specialized situations wherein parisons are intentionally heated in a non-uniform manner to intentionally achieve non-uniform weight conditions in the finished article.) To achieve this uniformity the flow of heating air through the oven is carefully controlled and in accordance with one arrangement, the individual carrier members are rotated about their axes, thereby rotating the parisons carried thereon to achieve uniformity in the circumferential direction. In addition, the various means provided for controlling the juxtaposition of the heating means and the parisons assumes that the parisons are properly positioned on their respective carrier members. Hence, if a parison is not properly positioned on its carrier member, it will most likely be heated in an unintentional non-uniform manner resulting in scrap rather than an acceptable finished article. Indeed, even if an improperly positioned parison does get heated in a uniform manner as it travels through the oven, it will no doubt become defective at the discharge station where the gripping means which would be positioned to grasp a properly positioned parison would grasp the improperly positioned parison at the incorrect point thereon. Since this gripping means also holds the parisons during the subsequent stretching and blow molding operations, it will be immediately apparent that this improperly gripped parison will be positioned incorrectly at the stretching and molding stations, once again resulting in an unacceptable finished article, i.e. scrap.

The difficulty can be best explained by referring to FIG. 3. The assumption has been that the cold parisons loaded vertically by gravity onto the carrier members at the loading station 12 have a precise inside diameter and are perfectly round. If this is the case, then the parisons will fall down over the carrier member 40 and rest on the flange surface 40a. However, the difficulty is that the parison inside diameter might be smaller than anticipated or it might be slightly oval rather than round. In either event the parison will not fall all the way to the flanged portion 40a. Indeed, if the carrier member 40 were provided with a uniform diameter throughout its length, the parison might simply hit the top thereof and fall off. However, to assure at least a temporary tentative positioning of the parison onto its respective carrier member, the carrier member 40 is provided with a reduced diameter portion 40b so that the parison will at least be retained by this portion 40b with the bottom of the parison resting on the shoulder 41.

The present invention is particularly concerned with an apparatus for positively locating the parison onto its carrier member with the bottom of the parison resting on the flange 40a. This positive placement station is shown at 15 in FIG. 1. From a purely manipulative point of view, the only requirement is that this positive placement stage be located downstream from the loading station 12. However, it is preferred to allow the parisons to complete one or two passes through the oven before reaching the positive placement station. This will permit the parison to become somewhat softer and more pliable so that it will more easily conform to the size and shape of the lower portion of carrier member 40 while it is still stiff enough not to buckle under the forces that are now to be applied downwardly to it.

Referring now to FIGS. 2 and 3, there is shown a first embodiment of a parison positioning apparatus. In this case the apparatus includes a central column 21 operatively fixed to the sprocket 20 of the endless conveyor 11 to rotate therewith. A plate member 22 is fixed to the column 21 so that it also rotates therewith. A cam 25 is located above the plate 22 and is fixed relative to the oven housing. This cam will preferably include a single "high" portion 25a with the cam progressing to a low point 180° removed therefrom (not shown in the figures).

The plate 22 includes a plurality of vertical openings 23 spaced thereabout, each directly over a carrier member on the endless conveyor 11 as the latter passes about the axis of column 21. A rod 30 extends vertically through each of the openings 23. At its upper end, the rod is bifurcate at 31 and rotatably receives a cam follower 32. A flange 33 is fixed to the rod and extends outwardly therefrom. A spring 34 mounted between the upper surface of plate 22 and the lower surface of flange 33 urges the rod 30 and hence also the follower 32 into engagement with the surface of cam 25. At its lower end the rod 30 has slidably mounted thereon a positioning cap 35. The downward limit of this cap is formed by a nut 37 attached to the rod 30. The cap is movable upwardly opposing the downward force of spring 36.

As illustrated in FIG. 3, the positioning cap 35 includes a downwardly convex, i.e. essentially conical surface with the lower portion thereof having a diameter smaller than the inside diameter of the parison. This will permit the bottom of positioning cap 35 to easily enter the parison and then properly center it on the carrier member 40 while urging it downwardly against flange 40a. The lower surface of the positioning cap can also be constructed with a rather wide conical surface so that the same cap will be applicable to parisons with different inside diameters. Although the dimensions of the various elements will depend on specific operating conditions and will be apparent to one skilled in the art, it might be noted that the cam surface 25 should be constructed so that the positioning cap 35 is sufficiently high for a parison to pass beneath it as the positioning cap and its respective parison move into vertical alignment with each other. The rod 30 then must be moved downwardly a sufficient distance to enter the parison and urge it downwardly onto the flange 40a.

Figure 5:
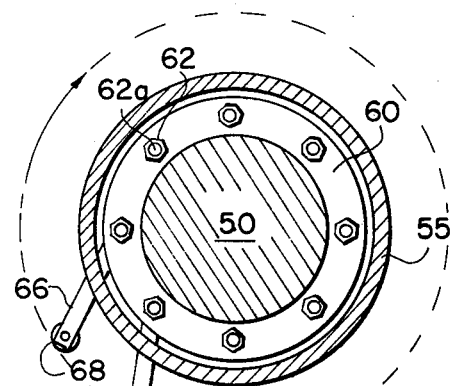
FIG. 5 is a reduced cross-sectional view taken along line 5—5 of FIG. 4.
Figure 4:
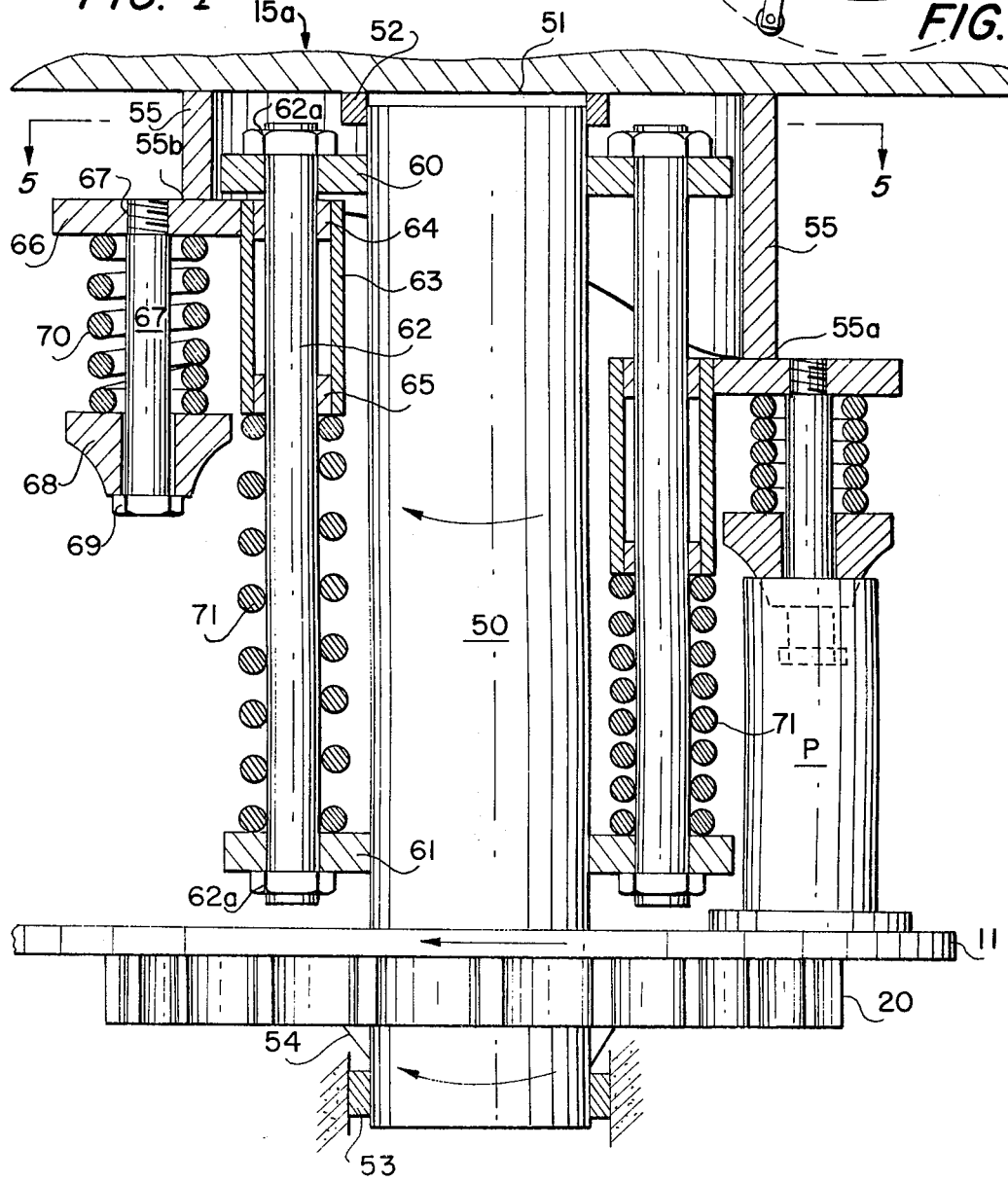
FIG. 4 is a cross-sectional view of a further embodiment of a parison positioning apparatus constructed in accordance with the features of the present invention, this figure illustrating the apparatus as viewed in a plane through the line B—B of FIG. 1.

Referring now to FIGS. 4 and 5, there is shown a further embodiment of the present invention. In some situations the vertical height within the oven might be too limited to permit the type of arrangement shown in FIG. 2. In this case it might be necessary to somewhat "compact" in a vertical direction the overall positioning apparatus, and especially the cam and follower means. Such an arrangement is shown in FIGS. 4 and 5 and is referred to generally by the numeral 15a.

Referring now to these figures there is shown a central column 50 which is fixedly connected to the sprocket 20 by any suitable means. A weld 54 is diagramatically indicated in FIG. 4. The column 50 is mounted for rotation with the sprocket 20 by any suitable means. Suitable upper and lower bearings 52 and 53 are indicated schematically in FIG. 4, the bearings 52 being located adjacent the low ceiling 51.

A cam 55 is fixed with respect to the ceiling 51 and includes a high point and a low point 55a and 55b, respectively, as shown in FIG. 4. In this sense the cam 55 is similar to the cam 25. However, to preserve space this cam is essentially a hollow cylinder above its lower operative surface.

Upper circular flanges 60 and 61 are fixed with respect the column 50 to rotate therewith. A rod 62 is provided for each positioning cap and this rod extends vertically and is fixed to the flanges 60 and 61 by suitable means such as nuts 62a.

Surrounding the rod 62 is a cylindrical housing 63 which operatively engages the rod 62 for sliding movement therealong by means of upper and lower bushings 64 and 65. An arm 66 is fixed with respect to the housing 63 and extends outwardly therefrom. A rod 67 is fixedly secured to the arm 66 by suitable means such as threading 67a. At the lower end of the rod 67 there is provided a positioning cap 68, the lower limit of which is limited by nut 69 on the rod 67, this positioning cap being urged downwardly by a spring 70 acting between the bottom of arm 66 and the top of positioning cap 68. This cap 68 is of course similar to the positioning cap 35 in the embodiment of FIG. 2.

As will be evident from FIG. 4, the upper surface of the arms 66 engage the operative lower surface of cam 55. As the arm 66 moves to the high point 55a of the cam 55 this arm 66 is moved downwardly against the force of a spring 71 acting between the bottom of housing 63 and the upper surface of the lower flange 61. The operation of the embodiment of FIG. 4 is identical to that of FIG. 2, i.e. a separate positioning cap 68 is provided in vertical alignment with each parison passing therebeneath on the endless conveyor 11 and the cam, the positioning caps and the spring means are so constructed and arranged that the positioning caps will easily move over improperly positioned parisons as they move into vertical alignment therewith and will then move downwardly a sufficient distance to urge the respective parison against its respective base flange 40a.

In both of the illustrated embodiments the positioning cap is not rigidly secured to its respective rod, but rather it is slidable thereon urged downwardly by a spring means. This is to provide some resilience between the positioning cap and the parison so that the positioning cap will not damage the parison when the latter offers some resistance to the downward force applied to it.

As mentioned above, a main advantage of the FIG. 4 embodiment is that it saves space in the vertical direction. It might also be necessary to conserve space in the radial direction. Consequently, and referring to FIG. 5, rather than have the arms 66 extend radially relative to the axis of column 50, it might be preferable to have these arms extend at an angle to the radius as shown for example in FIG. 5.

FIG. 6 illustrates a modification of the positioning cap as shown in either of the illustrated embodiments. In this case the positioning cap is constructed so as to be downwardly concave rather than downwardly convex.

Although the invention has been described in considerable detail with respect to a preferred embodiment, it will be apparent that the invention is capable of numerous modifications and variations apparent to those skilled in the art without departing from the spirit and scope of the invention as defined in the claims.

I claim:

1. A device for positioning tubular workpieces comprising:
   a conveyor means having a plurality of carrier members thereon, each positioned to receive a tubular workpiece and to hold the same in an upright position,
   and a positive placement station along said conveyor means including a positioning cap, and means for moving the positioning cap downwardly against the top of a workpiece to positively position it on its respective carrier member,
   said positioning cap having a substantially symmetrical portion engageable with an inner peripheral portion of a workpiece for the centering of a workpiece on its respective carrier member.

2. A device according to claim 1, including a cam and follower means for urging the positioning cap downwardly against the workpiece.

3. A device according to claim 2, said positioning cap being movable with the conveyor means for a portion of the conveyor means travel, and said cam and follower means being operable to lower the positioning cap against the top of said portion and then to raise the positioning cap away from the workpiece.

4. A device according to claim 1, said positioning cap being downwardly convex, the apex thereof being smaller in diameter than the inside diameter of a workpiece receivable on the carrier member.

5. A device according to claim 1, said positioning cap being downwardly concave, the inside diameter at the lower end of the cap being larger than the outside diameter of a workpiece receivable on the carrier member.

6. In an oven having a conveyor means with a plurality of carrier members thereon for receiving hollow tubular parisons and supporting them in an upright position while carrying them through the oven for heating them to a forming temperature, the improvement comprising:
   a positive placement means for positively engaging the tops of the parisons while the parisons are on their respective carrier members, and exerting a downward force thereon to assure that each parison is positively positioned on its respective carrier member,
   said placement means having a symmetrical portion engageable with an inner peripheral portion of a parison for the centering of a parison on its respective carrier member.

7. An oven according to claim 6, including a loading station for loading the parisons by gravity onto their respective carrier members, and positive placement means being located within the oven a short distance downstream from said loading station, whereby the parisons are at least slightly heated in the oven before reaching the positive placement means.

8. An oven according to claim 7, said positive placement means being movable with the conveyor for a portion of the conveyor travel.

9. An oven according to claim 6, said conveyor means including at least one horizontal turn about a vertical axis, said positive placement means being located inside said turn so that the said portion comprises a portion of said turn.

10. An oven according to claim 9, said positive placement means including a positioning cap operatively associated with a cam and follower means which imparts vertical movement thereto for engaging the parisons.

11. A device for positively positioning tubular workpieces comprising:
   a conveyor means having a plurality of carrier members thereon, each positioned to receive a tubular workpiece and to hold the same in an upright position,
   a positive placement station along said conveyor means including a positioning cap, and means for moving the positioning cap downwardly against the top of a workpiece to positively position it on its respective carrier member,
   a cam and follower means for urging the positioning cap downwardly against the workpiece,
   said positioning cap being movable with the conveyor means for a portion of the conveyor means travel, and said cam and follower means being operable to lower the positioning cap against the top of said portion and then to raise the positioning cap away from the workpiece,
   said positive placement station located inside of a horizontal turn of the conveyor means about a vertical axis, and including a mounting means turnable about a vertical axis and including a plurality of positioning caps thereon, said cam and follower means being operable against all of said positioning caps to lower each of them during a certain portion of said turn.

12. A device according to claim 11, said positioning caps being vertically slidably mounted on their respective rods, and including spring means for urging each said positioning cap to the lower end of its respective rod.

13. A device according to claim 11, each positioning cap mounted at the lower end of a vertically extending rod, which rod is in turn to an arm extending inwardly toward the mounting means, means mounting each said arm for vertical sliding movement and including spring means urging each arm upwardly, said cam and follower means comprising a fixed cam above said arms, said arms engaging the cam and constituting the follower.

14. A device according to claim 13, said positioning caps being vertically slidably mounted on their respecitve rods, and including springs means for urging each said positioning cap to the lower end of its respective rod.

15. In an oven having a conveyor means with a plurality of carrier members thereon for receiving parisons and supporting them in an upright position while carrying them through the oven for heating them to a forming temperature, the improvement comprising:
   a positive placement means for positively engaging the tops of the parisons while parisons are on their respective carrier members, and exerting a downward force thereon to assure that each parison is positively positioned on its respective carrier member.
   a loading station for loading the parisons by gravity onto their respective carrier members, said positive placement means being located within the oven a short distance downstream from said loading station, whereby the parisons are at least slightly heated in the oven before reaching the positive placement means, said positive placement means being movable with the conveyor for a portion of the conveyor travel, said conveyor means including at least one horizontal turn about a vertical axis, said positive placement means being located inside said turn so that the said portion comprises a portion of said turn, said positive placement means including a positioning cap operatively associated with a cam and follower means which imparts vertical movement thereto for engaging the parisons, each positioning cap mounted at the lower end of a vertically extending rod, said cam and follower means including a cam follower at the upper end of each rod and a fixed cam located above and engaged by all of said cam followers, said cam including a high point at said portion of the conveyor travel, and including spring means for urging the said followers against the cam.

16. In an oven having a conveyor means with a plurality of carrier members thereon for receiving parisons and supporting them in an upright position while carrying them through the oven for heating them to a forming temperature, the improvement comprising:

a positive placement means for positively engaging the tops of the parisons while the parisons are on their respective carrier members, and exerting a downward force thereon to assure that each parison is positively positioned on its respective carrier member, a loading station for loading the parisons by gravity onto their respective carrier members, said positive placement means being located within the oven a short distance downstream from said loading station, whereby the parisons are at least slightly heated in the oven before reaching the positive placement means, said positive placement means being movable with the conveyor for a portion of the conveyor travel, said conveyor means including at least one horizontal turn about a vertical axis, said positive placement means being located inside said turn so that the said portion comprises a portion of said turn, said positive placement means including a positioning cap operatively associated with a cam and follower means which imparts vertical movement thereto for engaging the parisons, each positioning cap mounted at the lower end of a vertically extending rod, which rod is in turn fixed to an arm extending generally toward said axis, means mounting each said arm for vertical sliding movement and including spring means for urging each arm upwardly, said cam and follower means comprising a fixed cam above said arms, and arms engaging the cam and constituting a follower.

17. In an oven having a conveyor means with a plurality of carrier members thereon for receiving parisons and supporting them in an upright position while carrying them through the oven for heating them to a forming temperature, the improvement comprising:

a positive placement means for positively engaging the tops of the parisons while the parisons are on their respective carrier members, and exerting a downward force thereon to assure that each parison is positively positioned on its respective carrier member, a loading station for loading the parisons by gravity onto their respective carrier members, said positive placement means being located within the oven a short distance downstream from said loading station, whereby the parisons are at least slightly heated in the oven before reaching the positive placement means, said positive placement means being movable with the conveyor for a portion of the conveyor travel, said conveyor means including at least one horizontal turn about a vertical axis, said positive placement means being located inside said turn so that the said portion comprises a portion of said turn, a mounting means turnable about said vertical axis, said positive placement means connected to the mounting means to rotate therewith, said mounting means being integral with a sprocket of the conveyor means at said turn to turn therewith.

18. An oven according to claim 17, including a cam and follower means for imparting vertical movement to said positive placement means.

19. An oven according to claim 18, said positive placement means comprising a plurality of separate positioning caps spaced about said mounting means and turnable therewith, a cam follower associated with each positioning cap and turnable therewith about said axis, and a fixed cam engaged by said followers for determining the vertical movement of said positioning caps.

* * * * *